United States Patent
Simon et al.

(10) Patent No.: US 12,480,451 B2
(45) Date of Patent: Nov. 25, 2025

(54) MECHANICAL REDUCER FOR AN AIRCRAFT TURBOMACHINE

(71) Applicants: SAFRAN TRANSMISSION SYSTEMS, Colomes (FR); SAFRAN AIRCRAFT ENGINES, Paris (FR)

(72) Inventors: Adrien Louis Simon, Moissy-Cramayel (FR); Luc Henri Chatenet, Moissy-Cramayel (FR); Boris Pierre Marcel Morelli, Moissy-Cramayel (FR); Jonathan Jean-Pierre Rouffet, Moissy-Cramayel (FR)

(73) Assignees: SAFRAN TRANSMISSION SYSTEMS, Colombes (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/305,208

(22) Filed: Apr. 21, 2023

(65) Prior Publication Data

US 2023/0340912 A1    Oct. 26, 2023

(30) Foreign Application Priority Data

Apr. 22, 2022  (FR) ...................................... 2203777

(51) Int. Cl.
*F02C 7/36*  (2006.01)
*F02C 7/06*  (2006.01)

(52) U.S. Cl.
CPC .................. *F02C 7/36* (2013.01); *F02C 7/06* (2013.01); *F05D 2220/323* (2013.01); *F05D 2240/50* (2013.01); *F05D 2260/40311* (2013.01)

(58) Field of Classification Search
CPC ....... F05D 2260/40311; F05D 2240/50; F02C 7/36; F02C 7/06; F16H 57/08; F16H 57/082; F16H 2057/085
See application file for complete search history.

(56) References Cited

U.S. PATENT DOCUMENTS

2012/0309582 A1 *  12/2012  McCune ................... F02C 7/06
                                                                 475/331
2019/0011039 A1      1/2019  Yugi
(Continued)

FOREIGN PATENT DOCUMENTS

DE    10 2019 125 052 A1    3/2021
FR              3086343 A1 *  3/2020  ............. F01D 15/12
(Continued)

OTHER PUBLICATIONS

France Search Report and Written Opinion mailed Oct. 18, 2022, issued in Application No. FR2203777, filed Apr. 22, 2022, 7 pages.

*Primary Examiner* — Courtney D Heinle
*Assistant Examiner* — Jesse M Prager
(74) *Attorney, Agent, or Firm* — Christensen O'Connor Johnson Kindness PLLC (57) ABSTRACT

A mechanical reducer for a turbomachine for an aircraft, this reducer having a sun gear with internal splines and an external toothing, a ring gear which extends around the sun gear and which has an internal toothing, planet gears which are arranged between the sun gear and the ring gear and which each have at least one external toothing meshing with the external toothing of the sun gear and the internal toothing of the ring gear, and a planet carrier which carries first bearings for guiding the planet gears in rotation. The reducer can further include at least one second bearing for guiding the sun gear in rotation. The at least one second bearing can be mounted between the sun gear and the planet carrier.

16 Claims, 11 Drawing Sheets

(56) References Cited

U.S. PATENT DOCUMENTS

| | | | | |
|---|---|---|---|---|
| 2020/0003068 A1* | 1/2020 | Fontana | ................ | F01D 15/12 |
| 2020/0332721 A1* | 10/2020 | Simon | ..................... | F16H 1/28 |
| 2021/0148454 A1* | 5/2021 | Sheridan | ................. | F02C 7/06 |
| 2021/0156313 A1* | 5/2021 | Maguire | .................. | F02K 3/06 |
| 2021/0317788 A1* | 10/2021 | Simon | ................. | F16H 57/082 |
| 2022/0074490 A1* | 3/2022 | Simon | .................... | F01D 15/12 |

FOREIGN PATENT DOCUMENTS

| | | | | | |
|---|---|---|---|---|---|
| FR | 3104644 A1 * | 6/2021 | | ............... | F02C 7/36 |
| WO | 2017/115795 A1 | 7/2017 | | | |
| WO | WO-2020065182 A1 * | 4/2020 | | ............ | F01D 15/12 |

\* cited by examiner

MECHANICAL REDUCER FOR AN AIRCRAFT TURBOMACHINE

CROSS-REFERENCE TO RELATED APPLICATION

This application claims priority to FR 2203777, filed Apr. 22, 2022, the disclosure of which is hereby expressly incorporated by reference herein in its entirety.

TECHNICAL FIELD

The present disclosure relates to the field of mechanical reducers for turbomachines, in particular for aircraft.

BACKGROUND

The prior art includes documents WO-A1-2010/092263, FR-A1-2 987 416, FR-A1-3 008 462, FR-A1-3 008 463, FR-A1-3 041 054, FR-A1-3 095 251, FR-A1-3 111 390, FR-A1-3 111 400, WO-A1-2017/115795 et DE-A1-10 2019 125052.

The role of a mechanical reducer is to modify the speed and torque ratio between the input shaft and the output shaft of a mechanical system.

The new generations of double-flow turbomachines, in particular those with a high bypass ratio, comprise a mechanical reducer to drive the shaft of a fan. The usual purpose of the reducer is to convert the rotational speed referred to as high speed of the shaft of a power turbine into a slower rotational speed for the shaft driving the fan.

Such a reducer comprises a central sprocket, referred to as sun gear, a ring gear and sprockets referred to as planet gears, which are engaged between the sun gear and the ring gear. The planet gears are held by a frame referred to as planet carrier. The sun gear, the ring gear and the planet carrier are planetary gears because their axes of revolution coincide with the longitudinal axis X of the turbomachine. The planet gears each have a different axis of revolution equidistant on the same operating diameter around the axis of the planetaries. These axes are parallel to the longitudinal axis X.

There are several reducer architectures. In the prior art of the double-flow turbomachines, the reducers are of the planetary or epicyclic type. In other similar applications, there are architectures referred to as differential or "compound."

In a planetary reducer, the planet carrier is stationary and the ring gear is the output shaft of the device which rotates in the opposite direction of the sun gear.

In an epicyclic reducer, the ring gear is stationary and the planet carrier is the output shaft of the device which rotates in the same direction as the sun gear.

On a compound reducer, no element is attached in rotation. The ring gear rotates in the opposite direction of the sun gear and the planet carrier.

The reducers can consist of one or more gearing stages. This meshing is ensured in different ways such as by contact, friction or magnetic field. There are several types of contact meshing such as straight, helical or herringbone toothings.

The increase in reduction ratios of target engine architectures is leading to the use of reducers referred to as "double stage." Indeed, beyond a ratio of around 7, the technology referred to as "single-stage" loses its interest because it is no longer compact enough. Reducers referred to as "double-stage" must be used.

In single-stage technology, the same toothing of a planet gear cooperates with the sun gear and the ring gear. In a dual-stage technology, the toothing of the planet gear that cooperates with the sun gear is different from the toothing of the planet gear that cooperates with the ring gear. In general, the toothings of a planet gear that cooperate with the sun gear and the ring gear respectively have different average diameters.

In operation, the sun gear is self-centered on the axis X, regardless of the type of toothing of this sun gear (straight, helical, herringbone). The sun gear is naturally positioned between the planet gears, whose number is generally greater than or equal to three.

The use of straight toothing does not ensure that the sprockets are axially positioned in relation to each other, so they are axially free and can rub against other components. The use of a helical toothing can generate significant axial forces in the sprockets, which can be solicited in the axial direction. To compensate for these phenomena, axial abutments can be provided in the reducer to limit the axial displacement stroke, in particular of the sun gear. However, this abutment does not ensure the centering of the sun gear in the radial direction.

The use of a herringbone toothing allows the sprockets to be positioned naturally in the axial direction and no axial abutments are needed. However, it does not ensure the centering of the sun gear in the radial direction either.

Under certain load conditions, the reducer can become very misaligned, generating a high restoring force and therefore high overloads in the toothings. To compensate this phenomenon, it is possible to soften the interface parts to a certain extent which potentially affects the dynamic behavior of the reducer and the engine, also generating overloads on the toothings and in the engine.

The present disclosure proposes an improvement that addresses some or all of the problems of the prior art, and is simple, effective and economical.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure relates to a mechanical reducer for a turbomachine, in particular an aircraft, this reducer comprising:
  a sun gear with a first axis of rotation, this sun gear comprising internal splines and an external toothing,
  a ring gear which extends around the sun gear and which comprises an internal toothing,
  planet gears which are arranged between the sun gear and the ring gear and which each comprise at least one external toothing meshing with the external toothing of the sun gear and the internal toothing of the ring gear, and
  a planet carrier which carries first bearings for guiding the planet gears in rotation about second axes parallel to the first axis,
  characterized in that it further comprises at least one second bearing for guiding the sun gear in rotation, the at least one second bearing being mounted between the sun gear and the planet carrier.

As mentioned above, the toothings, preferably in a herringbone pattern, allow for a self-centering of the sun gear during operation in the axial direction. The addition of a bearing or bearings for guiding the sun gear allows it to be centered in a radial direction and avoids the risk of misalignment of the sun gear.

The disclosure is compatible:
of a single-stage or multi-stage reducer,
of a reducer referred to as epicyclic, planetary or differential,
of any type of planet carriers, whether it is monobloc or of the cage and cage carrier type, and
of any type of planet gear bearing, whether it is composed of rolling elements, a hydrodynamic bearing, etc.

The reducer according to the disclosure may comprise one or more of the following characteristics, taken alone or in combination with each other:
the sun gear comprises a first axial tubular extension which extends to one side of the sun gear and on which the at least one second bearing is mounted;
the sun gear comprises a second axial tubular extension which extends to an opposite side of the sun gear and on which a further second bearing is mounted;
the first and second extensions comprise external cylindrical surfaces for mounting the second bearings, which have a same diameter;
the first and second extensions comprise external cylindrical surfaces for mounting the second bearings, which have different diameters;
the cylindrical surface with the largest diameter is located on the same side as the splines of the sun gear;
the second bearings are at an axial distance from each other, which is less than an axial dimension of the first bearings or the planet gears;
the splines and the toothing of the sun gear are passed through by a same median plane perpendicular to the first axis;
the median plane is a plane of symmetry of the sun gear;
the splines and the toothing of the sun gear are passed through by two distinct planes which are perpendicular to the first axis, the at least one second bearing or one of the second bearings being located axially between these two planes;
the at least one second bearing is a rolling bearing or a plain bearing;
the at least one second bearing allows one degree of freedom in the axial direction;
the at least one second bearing is a roller bearing;
the planet gears are arranged around the at least one second bearing;
the second bearings are one or two:
the toothing of the sun gear comprises two annular series of teeth separated from each other by an external annular gorge;
the at least one second bearing has an internal diameter smaller than the internal diameter of the toothing of the sun gear, and an external diameter greater than the external diameter of the toothing of the sun gear;
the two second bearings have identical diameters;
the two second bearings are located on two opposite axial ends of the sun gear and are located between two third bearings for guiding the planet carrier;
the second and third bearings are of different types, for example with different rollers;
the second and third bearings have different diameters;
the at least one second bearing has its internal ring integrated in the sun gear and in particular its extension or one of its extensions;
the at least one second bearing has its external ring integrated in the planet carrier and in particular a cylindrical edge of this planet carrier;
the toothing of the sun gear is a herringbone toothing;
the toothing of the ring gear is a herringbone toothing;
the at least one toothing of each planet gear is a herringbone toothing;
the sun gear is the sole sun gear of the reducer which comprises therefore a single sun gear;
the sun gear is guided by two second bearings which are located on either side of the toothing of the sun gear.

The disclosure also relates to a turbomachine, in particular for aircraft, comprising a mechanical reducer as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
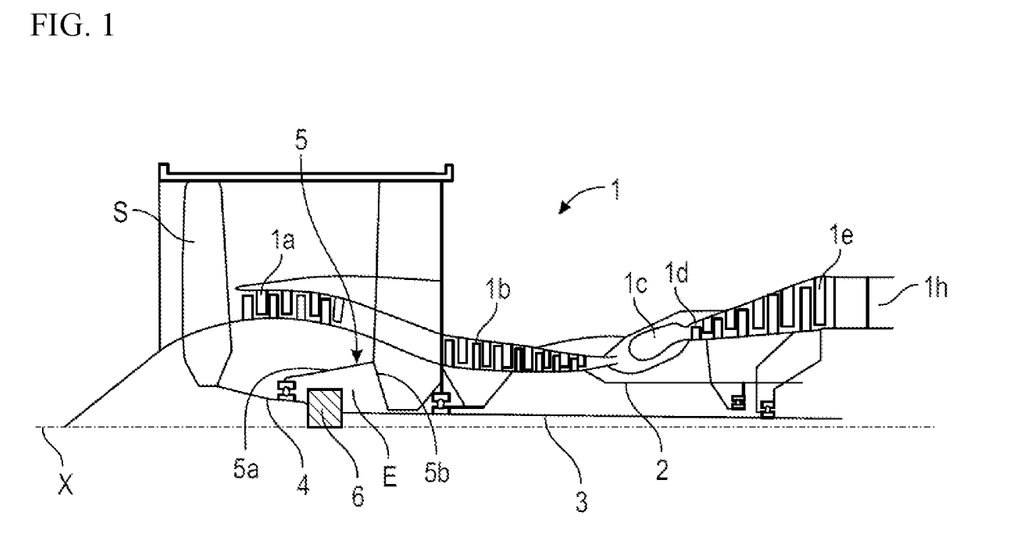
FIG. 1 is a schematic axial sectional view of a turbomachine using the disclosure.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven by the LP shaft 3 by means of a reducer 6. This reducer 6 is generally of the planetary, epicyclic or differential type.

The reducer 6 is positioned in the upstream portion of the turbomachine. A stationary structure comprising schematically, here, an upstream portion 5a and a downstream portion 5b which makes up the engine casing or stator 5 is arranged so as to form an enclosure E surrounding the reducer 6. This enclosure E is here closed upstream by joints at the level of a bearing allowing the passage of the fan shaft 4, and downstream by joints at the level of the passage of the LP shaft 3.

Figure 2:
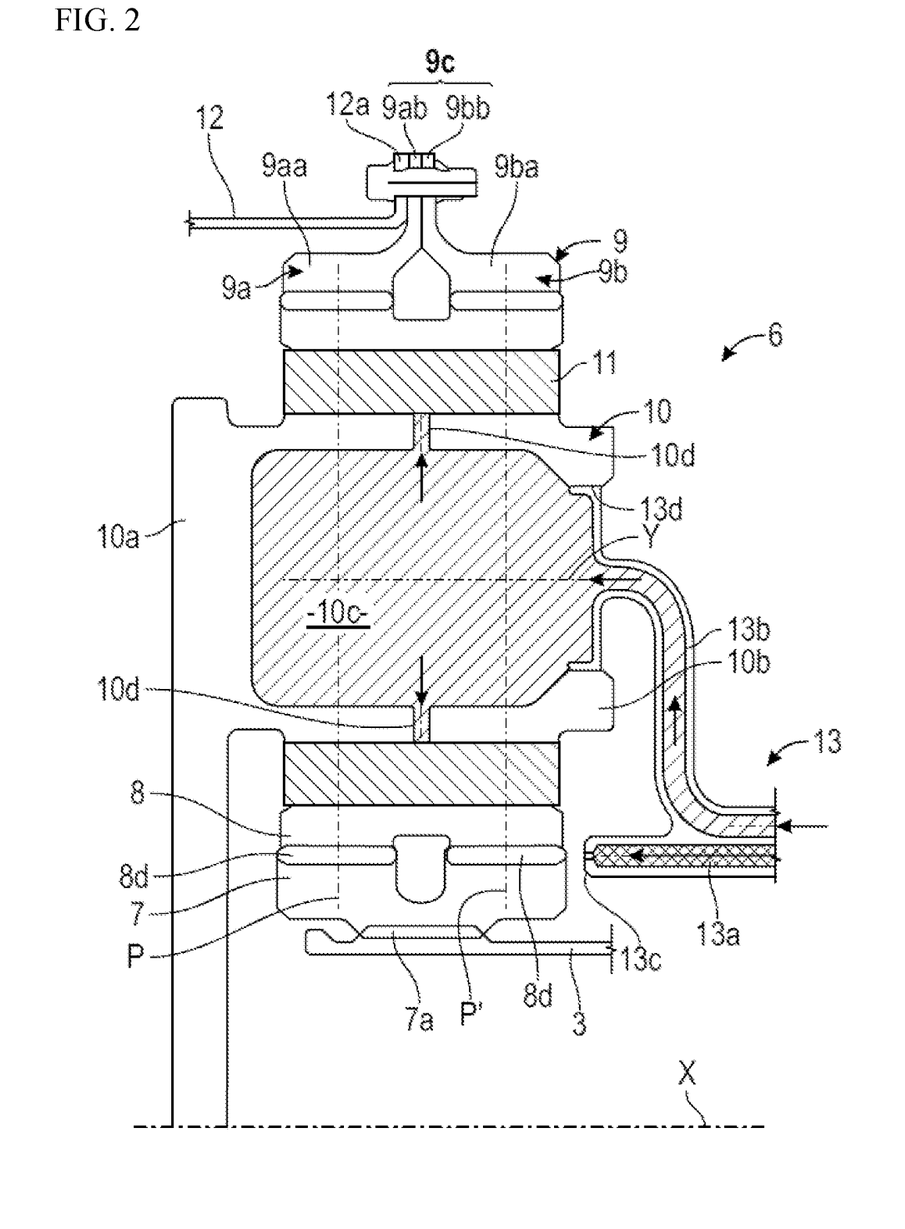
FIG. 2 is a partial axial sectional view of a mechanical reducer, of the single stage type.

FIG. 2 shows a reducer 6 with epicyclic train. In the inlet, the reducer 6 is connected to the LP shaft 3, for example by means of internal splines 7a. Thus the LP shaft 3 drives a planetary sprocket referred to as the sun gear 7. Classically, the sun gear 7, whose axis of rotation is coincident with that of the turbomachine X, drives a series of sprockets referred to as planet gears 8, which are equally distributed on the same diameter around the axis of rotation X. This diameter is equal to twice the operating center distance between the sun gear 7 and the planet gears 8. The number of planet gears 8 is generally defined between three and seven for this type of application.

The assembly of the planet gears 8 is held by a frame referred to as planet carrier 10. Each planet gear 8 rotates around its own axis Y, and meshes with the ring gear 9.

In the output we have:

In this epicyclic configuration, the assembly of the planet gears 8 drives the planet carrier 10 in rotation about the axis X of the turbomachine. The ring gear is attached to the engine casing or stator 5 via a ring gear carrier 12 and the planet carrier 10 is attached to the fan shaft 4.

In another planetary configuration, the assembly of the planet gears 8 is maintained by a planet carrier 10 which is attached to the engine casing or stator 5. Each planet gear drives the ring gear which is fitted to the fan shaft 4 via a ring gear carrier 12. In another differential configuration, the assembly of the planet gears 8 is maintained by a planet carrier 10 which is connected to a first fan shaft 5. Each planet gear drives the ring gear which is fitted to a second counter-rotating fan shaft 4 via a ring gear carrier 12.

Each planet gear 8 is mounted free in rotation by means of a bearing 11, for example of the rolling bearing or hydrodynamic bearing type. Each bearing 11 is mounted on one of the axles 10b of the planet carrier 10 and all axles are positioned relative to each other using one or more structural frame 10a of the planet carrier 10. There are a number of axles 10b and bearings 11 equal to the number of planet gears. For reasons of operation, mounting, manufacture, inspection, repair or replacement, the axles 10b and the frame 10a can be separated into several parts.

For the same reasons mentioned above, the toothing of a planet gear can be separated into several propellers or teeth each with a median plane P, P'. In our example, we detail the operation of a reducer in which each planet gear comprises two series of herringbone teeth cooperating with a ring gear separated into two half-ring gears:

an upstream half-ring gear 9a consisting of a rim 9aa and an attachment half-flange 9ab. On the rim 9aa is the front propeller meshed with a propeller of the toothing 8d of each planet gear 8. The propeller of the toothing 8d also meshes with that of the sun gear 7.

a downstream half-ring gear 9b consisting of a rim 9ba and an attachment half-flange 9bb. On the rim 9ba is the rear propeller meshed with a propeller of the toothing 8d of each planet gear 8. The propeller of the toothing 8d also meshes with that of the sun gear 7.

If the propeller widths vary between the sun gear 7, the planet gears 8 and the ring gear 9 because of the toothing overlaps, they are all centered on a median plane P for the upstream teeth and on another median plane P' for the downstream teeth.

FIG. 2 thus illustrates the case of a single gearing stage reducer, i.e. a same toothing 8d of each planet gear 8 cooperates with both the sun gear 7 and the ring gear 9. Even though the toothing 8d comprises two series of teeth, these teeth have the same average diameter and form a single toothing referred to as herringbone.

The attachment half-flange 9ab of the upstream ring gear 9a and the attachment half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

The arrows in FIG. 2 describe the conveying of the oil in the reducer 6. The oil enters the reducer 6 from the stator portion 5 into a dispenser 13 by different means which will not be specified in this view because they are specific to one or more types of architecture. The dispenser 13 comprises injectors 13a and arms 13b. The function of the injectors 13a is to lubricate the toothings and the function of the arms 13b is to lubricate the bearings. The oil is fed towards the injector 13a and exits through the end 13c to lubricate the toothings. The oil is also fed towards the arm 13b and circulates through the supply opening 13d of the bearing. The oil then circulates through the axle into one or more buffer areas 10c and out through the orifices 10d in order to lubricate the bearings of the planet gears.

Figure 3:
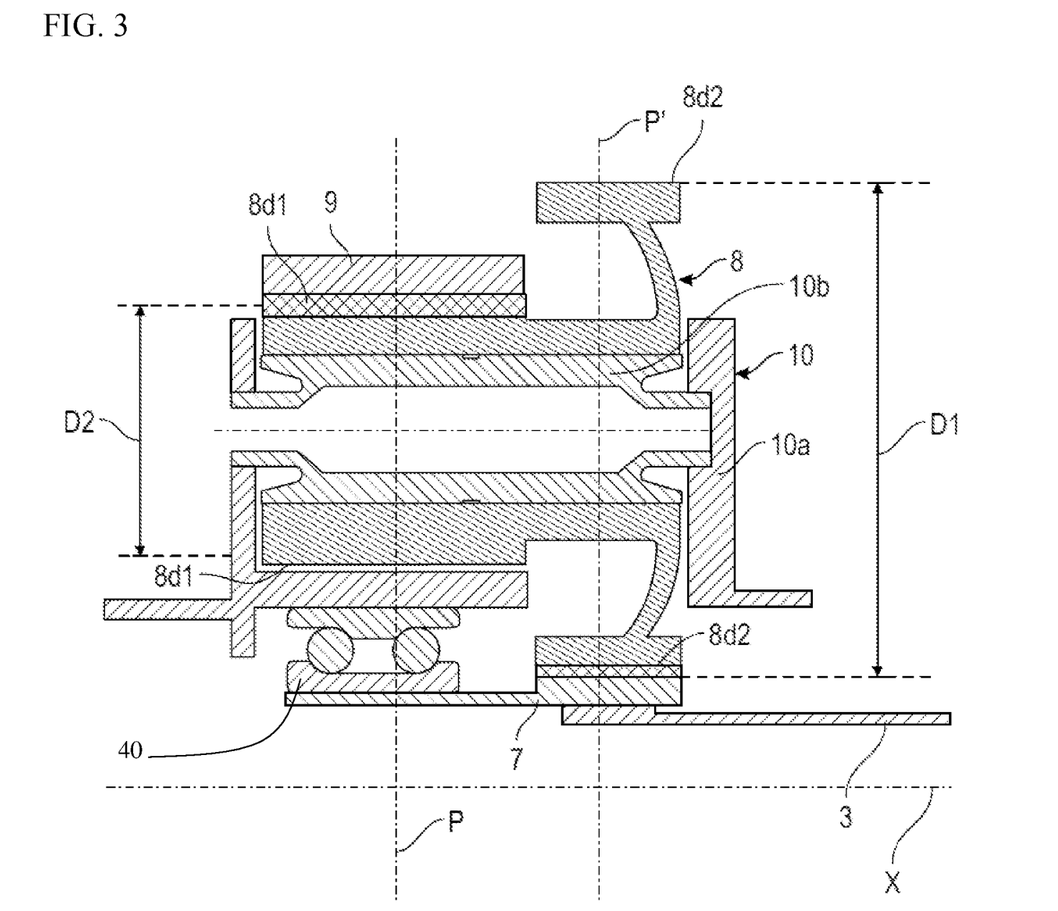
FIG. 3 is another partial view in axial cross-section of a mechanical reducer, of the double-stage type.

FIG. 3 shows another example of reducer architecture, referred to as a double gearing stage, in which each planet gear 8 comprises two separate toothings 8d1, 8d2 configured to cooperate respectively with the ring gear 9 and the sun gear 7.

In this FIG. 3, the elements already described in the foregoing are designated by the same references.

The toothing 8d1 meshing with the ring gear 9 has an average diameter noted D2 and is located in a median plane P. The toothing 8d2 meshing with the sun gear 7 has an average diameter noted D1 and is located in another median plane P'. The median planes P, P' are parallel to each other and perpendicular to the axis X. The diameter D2 is smaller than the diameter D1. Finally, each toothing 8d1, 8d2 comprises here a single propeller. As these propellers are not aligned with each other, in contrast to herringbone toothings, it is necessary to add an axial abutment 40. This abutment 40 is in the form of an abutment bearing and more particularly a ball bearing.

Figure 4:
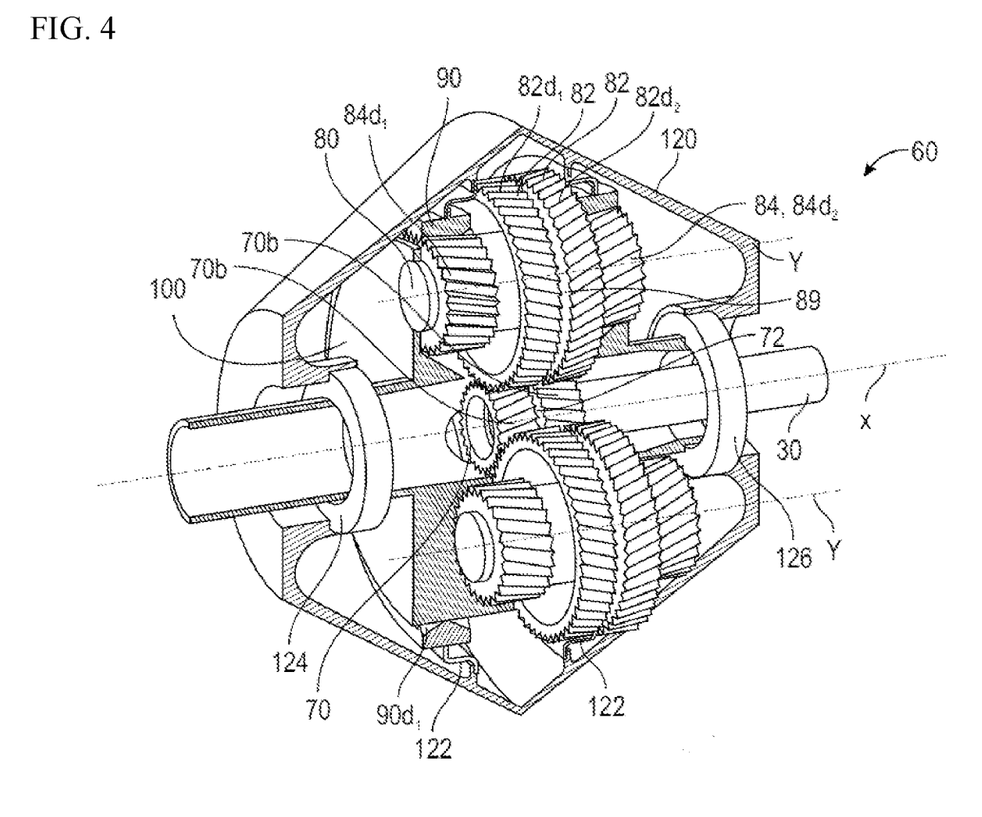
FIG. 4 is a schematic axial cross-section and perspective view of a mechanical reducer, of the symmetrical double-stage type.
Figure 5:
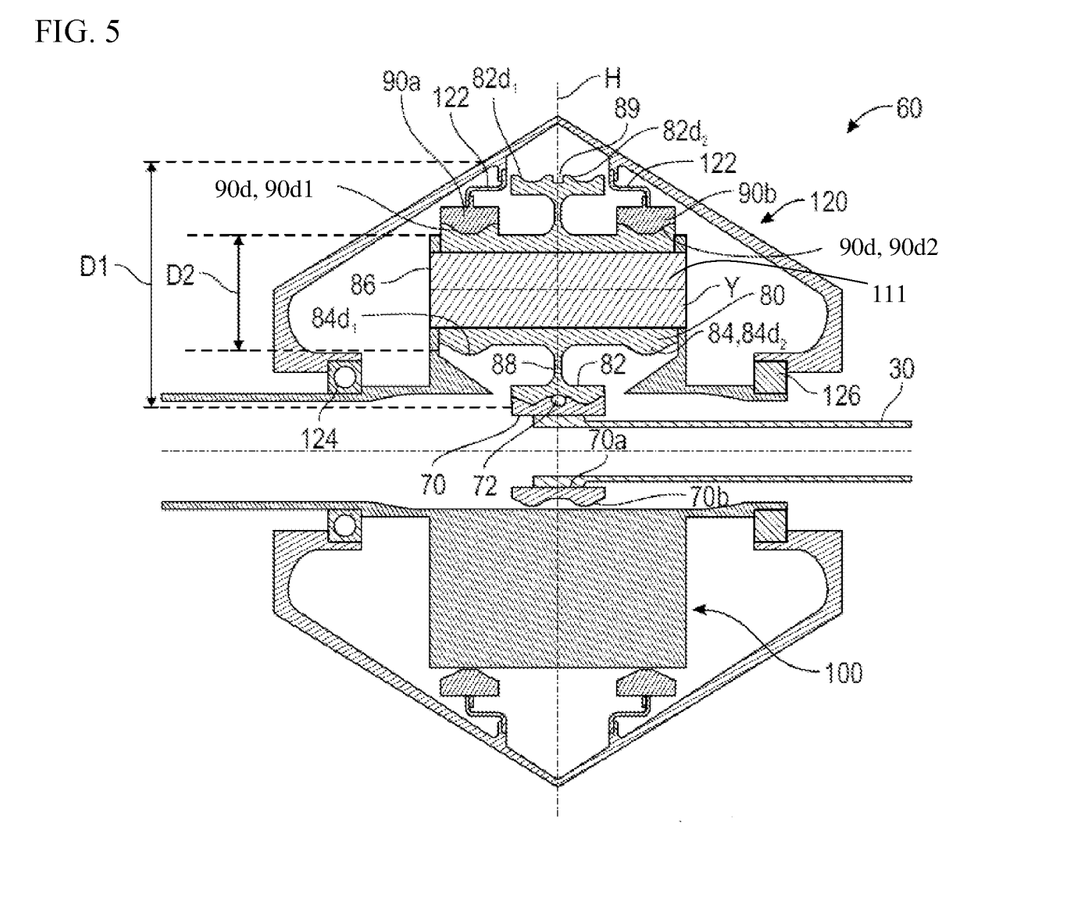
FIG. 5 is another schematic axial cross-section view of the reducer in FIG. 4.

FIGS. 4 and 5 show another example of reducer architecture, referred to as symmetrical double stage.

The reducer 60 of FIGS. 4 and 5 comprises:
a sun gear 70 having an axis of rotation X,
a ring gear 90 which extends around the sun gear and which is configured to be rotationally immovable about the axis X, and
planet gears 80 which are meshed with the sun gear 70 and the ring gear 90 and which are maintained by a planet carrier 100 which is configured to be movable in rotation about the axis X.

The plane H is defined as a median plane perpendicular to the axis X and passing substantially through the middle of the reducer 60 (FIG. 5).

The sun gear 70 comprises internal splines 70a for coupling with the LP shaft 30 as well as an external toothing 70b for meshing with the planet gears 80. The toothing 70b have two series of adjacent herringbone teeth, separated from each other by a radially outwardly oriented annular groove 72. The toothing 70b is symmetrical with respect to the plane H, its teeth being located on either side of the plane H which passes through the groove 72.

The ring gear 90 is formed by two independent annulus 90a, 90b and comprises a toothing 90d which is separated into two series of herringbone teeth 90d1, 90d2 carried respectively by the two annulus.

The annulus 90a, 90b are arranged symmetrically with respect to the plane H which thus extends between these annulus. The annulus are connected and attached to a ring gear carrier 120 by means of annular connecting flasks 122. The flasks 122 are independent of each other, each flask having a general S-shape in axial half-section providing it with a certain radial flexibility by elastic deformation during operation.

Each annulus 90a, 90b extends around the axis X and is attached to the corresponding flask 122 by its external periphery. Its internal periphery comprises one of the teeth 90d1, 90d2.

In the example shown, the ring gear carrier 120 has a generally annular shape around the axis X and more particularly is biconical. It thus comprises a first upstream or left-hand stretch in the drawing, with an upstream end of smaller diameter, and a downstream end of larger diameter which is connected to the upstream end of larger diameter of the other, downstream or right-hand stretch in the drawing. The larger diameter ends of the stretches are therefore connected to each other, and their smaller diameter ends form the axial ends of the ring gear carrier.

The upstream end of the ring gear carrier 120 extends around the planet carrier 100 or a shaft connected to this planet carrier, and is centered and guided in rotation on the planet carrier or the shaft by means of at least one bearing 124. Similarly, the downstream end of the ring gear carrier 120 extends around the planet carrier 100 or a shaft connected to this planet carrier, and is centered and guided in rotation on the planet carrier or the shaft by means of at least one further bearing 126.

As in the case of the ring gear 90, the ring gear carrier 120 is symmetrical with respect to the plane H which intersects the ring gear carrier in its middle and thus passes through the ends of the larger diameter of the aforementioned stretches.

Each planet gear 80 comprises a first toothing 82 of average diameter D1 for meshing with the sun gear 70, and a second toothing 84 of average diameter D2, different from D1 and in particular smaller than D1, for meshing with the ring gear 90. The average diameters are measured from the axis Y of each planet gear and represent the average between the maximum diameter and the minimum diameter of a toothing of that planet gear.

Each planet gear 80 comprises a cylindrical body 86 and an annular web 88 extending substantially radially outwards from the middle of this body 86. The toothing 84 are separated into two series of herringbone teeth 84d1, 84d2 which are located respectively on the axial ends of the body 86. The toothing 82 comprises two series of herringbone teeth 82d1, 82d2 which are located at the external periphery of the web 88 and which are separated from each other by an annular groove 89 opening radially outwards with respect to the axis Y.

The toothing 82 is passed through in its middle by the plane H which passes through the groove 89, the teeth 82d1, 82d2 being thus arranged on either side of the plane H. The teeth 84d1, 84d2 are also arranged symmetrically with respect to the plane H.

The toothing 82 and the external periphery of the web 88 have an axial dimension which is less than the axial distance between the annulus 90a, 90b as well as between the flasks 122, so that each planet gear 80 can rotate freely in the ring gear carrier 120 and between the annulus 90a, 90b and the flasks 122.

The "symmetry" of the toothings of the planet gears of the reducer allows the axial forces and the moments to which the planet gears are subjected during operation to be balanced.

The disclosure proposes an improvement to the technologies described above and illustrated in FIGS. 2 to 5.

The disclosure proposes to add to the mechanical reducer at least one bearing for guiding and centering the sun gear.

The reducer already comprises bearings, which can be referred to as first bearings, and which serve to the guiding and the centering of the planet gears. The reducer according to the disclosure comprises a further bearing or bearings, which may be referred to as second bearings, and which serve to the guiding and the centering of the sun gear. The first and second bearings are different. The first and second bearings may all be carried by the planet carrier or mounted in the planet carrier, with each of the first bearings extending inside a planet gear and the or each of the second bearings preferably extending around the sun gear and/or at the level of one (or both) of the axial ends of the sun gear. In addition, as shown in FIGS. 4 and 5, the reducer may comprise third bearings for guiding the ring gear carrier with respect to the planet carrier.

Figure 6:
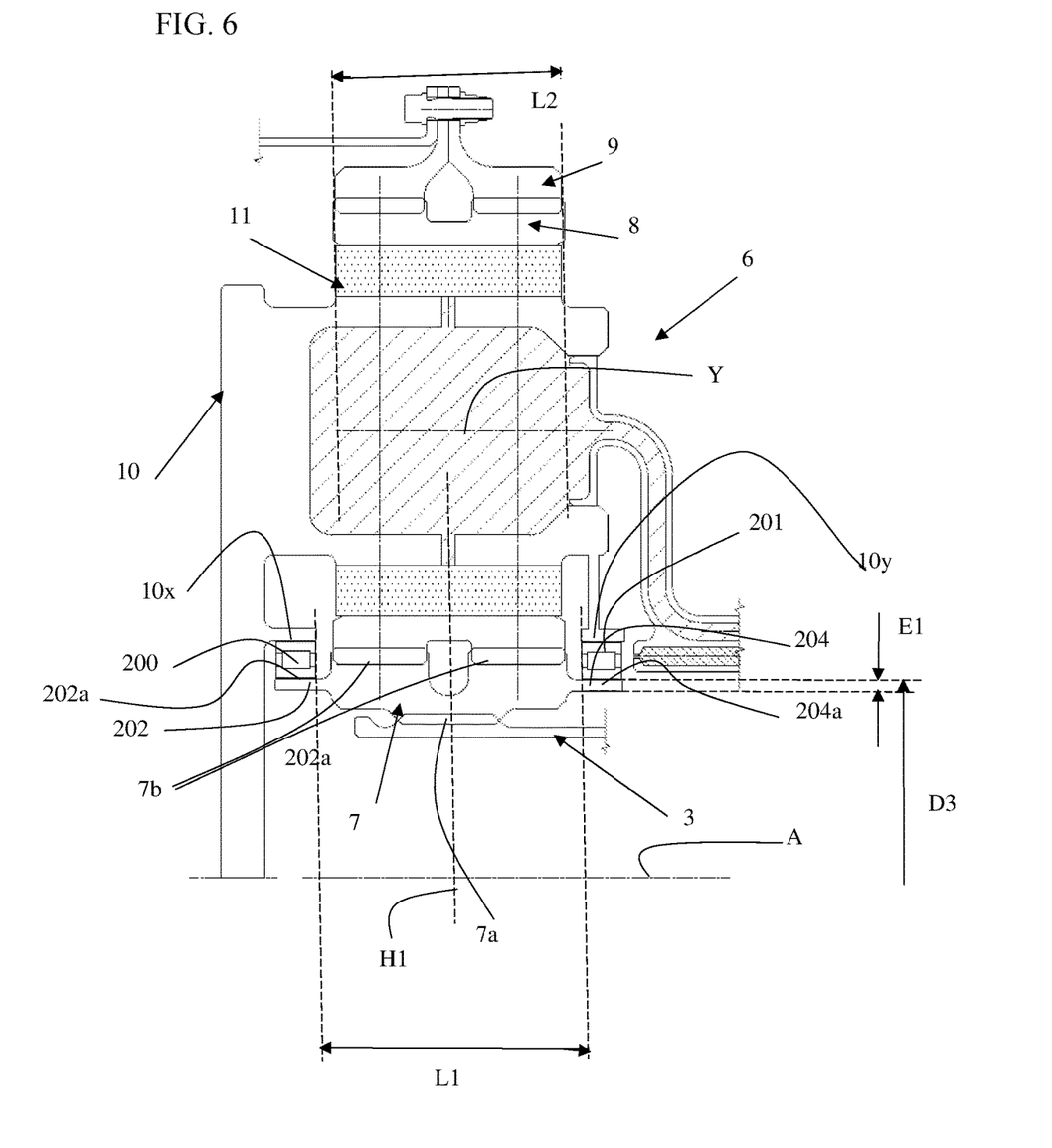
FIG. 6 is a partial axial sectional view of a mechanical reducer, of the single stage type, and illustrates a first embodiment of the disclosure.

FIG. 6 illustrates a first embodiment of the disclosure in the context of a single gearing stage reducer. In the following description with reference to this figure, the preceding description in relation to FIG. 2 also applies and relates to the disclosure insofar as it is not contrary to what follows.

Similarly, FIGS. 7 to 11 illustrate a second mode and alternative embodiments of the disclosure in the context of a double gearing stage reducer. In the following description with reference to these figures, the foregoing description in relation to FIGS. 4 and 5 also applies and relates to the disclosure insofar as it does not conflict with what follows.

The sun gear 7 in FIG. 6 comprises internal splines 7a and external herringbone toothing 7b. H1 is defined as a median plane passing through the middle of the sun gear 7 and perpendicular to the axis X. H1 passes through the middle of the toothing 7b and through the middle of the splines 7a. The toothing 7b is herringbone-shaped and comprises two series of teeth, respectively upstream and downstream, which are separated by an external annular gorge 7c. The series of teeth are symmetrical with respect to the plane H1.

The sun gear 7 is centering and guided in rotation about the axis X by two bearings, respectively upstream 200 and downstream 201. These bearings 200, 201 are mounted between the sun gear 7 and the planet carrier 10, and more precisely between axial extensions 202, 204 of the sun gear 7 and the planet carrier 10.

The sun gear 7 thus comprises an upstream axial extension 202 which is tubular and comprises an external cylindrical surface 202a on which an internal ring of the upstream bearing 200 is mounted. The external ring of this bearing 200 is radially supported on a cylindrical edge 10x of the planet carrier 10. This edge 10x projects, for example, from a radial wall of the planet carrier 10.

The sun gear 7 comprises a downstream axial extension 204 which is tubular and comprises an external cylindrical surface 204a on which an internal ring of the downstream bearing 201 is mounted. The external ring 200b of this bearing 201 is radially supported on a cylindrical edge 10y of the planet carrier 10. This edge 10y borders, for example, the central orifice of the planet carrier 10 through which the shaft 3 passes.

In the example shown, the bearings 200, 201 are identical and the surfaces 202a, 204a have a same diameter D3. The bearings 200, 201 are rolling bearings and more precisely rollers. Preferably, each of these bearings allows one degree of freedom of the sun gear 7 in the axial direction relative to the planet carrier 10.

The bearings 200, 201 are at an axial distance L1 from each other, which is less than an axial dimension L2 of the planet gears 8 or their bearings 11.

The bearings 200, 201 have an internal diameter smaller than the internal diameter of the toothing 7b of the sun gear 7, and an external diameter larger than the external diameter of the toothing 7b of the sun gear 7. The planet gears 8 are arranged around these bearings 200, 201.

The extensions 202, 204 may have a smaller radial thickness E1 than the rest of the sun gear 7, as shown in the drawing.

Figure 7:
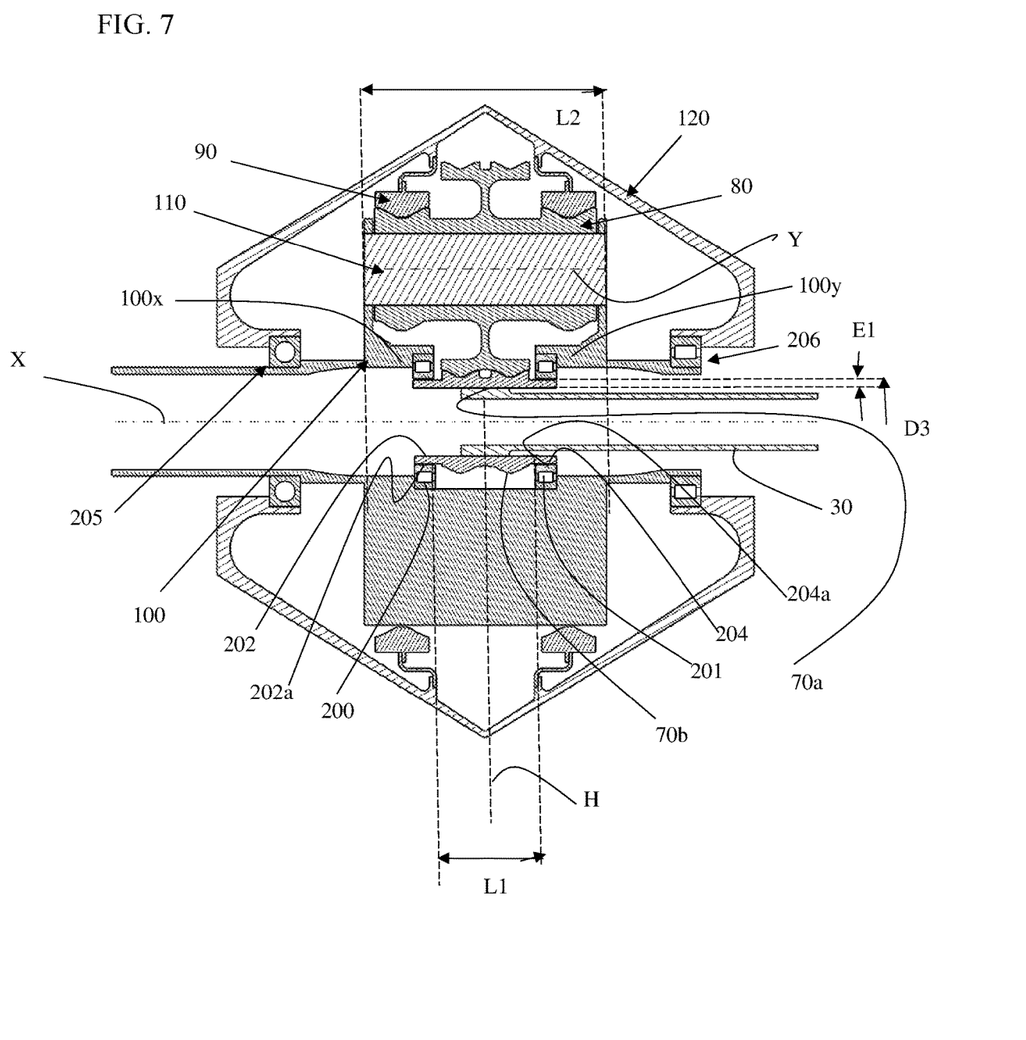
FIG. 7 is a schematic axial sectional view of a mechanical reducer, of the symmetrical double stage type, and illustrates a second embodiment of the disclosure.

The sun gear 70 in FIG. 7 comprises internal splines 70a and an external herringbone toothing 70b. The plane H passes through the middle of the toothing 70b and through the middle of the splines 70a. The toothing 70b is herringbone-shaped and comprises two series of teeth, upstream and downstream respectively, which are separated by an external annular gorge 72. The series of teeth are symmetrical with respect to the plane H.

The sun gear 70 is centered and guided in rotation about the axis X by two bearings, respectively upstream 200 and downstream 201. These bearings 200, 201 are mounted between the sun gear 70 and the planet carrier 100, and more precisely between axial extensions 202, 204 of the sun gear and the planet carrier 100.

The sun gear 70 thus comprises an upstream axial extension 202 which is tubular and comprises an external cylindrical surface 202a on which an internal ring 200a of the upstream bearing 200 is mounted. The external ring 200b of this bearing 200 is radially supported on a cylindrical edge 100x of the planet carrier 100. This edge 100x projects, for example, from a radial wall of the planet carrier 100.

The sun gear 70 comprises a downstream axial extension 204 which is tubular and comprises an external cylindrical surface 204a on which an internal ring 201a of the downstream bearing 200 is mounted. The external ring 200b of this bearing 201 is radially supported on a cylindrical edge 100y of the planet carrier 10. This edge 100y projects, for example, from a radial wall of the planet carrier 100 and may border, for example, the central orifice of the planet carrier 100 through which the shaft 30 passes.

In the example shown, the bearings 200, 201 are identical and the surfaces 202a, 204a have a same diameter D3. The bearings 200, 201 are rolling bearings and more precisely rollers. Preferably, each of these bearings allows one degree of freedom of the sun gear 70 in the axial direction relative to the planet carrier 100.

The bearings 200, 201 are at an axial distance L1 from each other, which is less than an axial dimension L2 of the planet gears 80 or their bearings 110.

The bearings 200, 201 have an internal diameter smaller than the internal diameter of the toothing 70b of the sun gear 70, and an external diameter larger than the external diameter of the toothing 70b of the sun gear 70. The planet gears 80 are arranged around these bearings 200, 201.

The extensions 202, 204 may have a smaller radial thickness E1 than the rest of the sun gear 70, as shown in the drawing.

FIG. 7 also shows that the bearings 200, 201, which are located on the two opposite axial ends of the sun gear 70, are located between two further bearings 205, 206, referred to as third bearings, which serve to guide the planet carrier 100 here relative to the ring gear carrier 120.

The bearings 200, 201, 205, 206 may be of different types (plain, rolling, etc.), and are for example with different rolling elements (rollers, balls, etc.). In the example shown, the bearing 205 is with balls and the bearing 206 is with rollers. The bearings 200, 201, 205, 206 may have different diameters.

Figure 8:
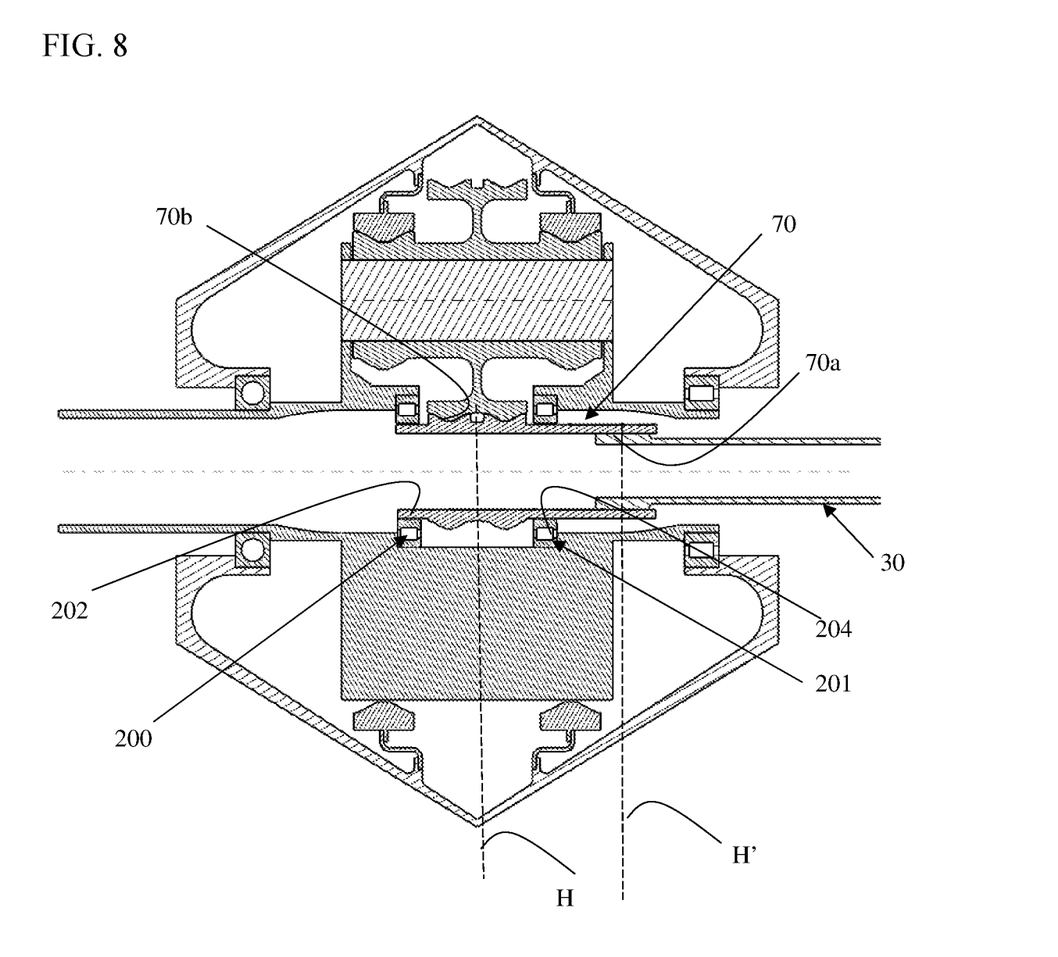
FIG. 8 is a schematic axial sectional view of a mechanical reducer, of the symmetrical double-stage type, and illustrates an alternative embodiment of the disclosure.

The sun gear 70 of FIG. 8 differs from that of FIG. 7 essentially in that its splines 70a are located at an axial end, here downstream, of the sun gear 70. The bearing 201 is thus located axially between the toothing 70b and the splines 70a. In other words, the toothings 70b are passed through by the plane H, the splines 70a are passed through by a separate plane H', and the bearing 201 is located between these planes H, H'.

Figure 9:
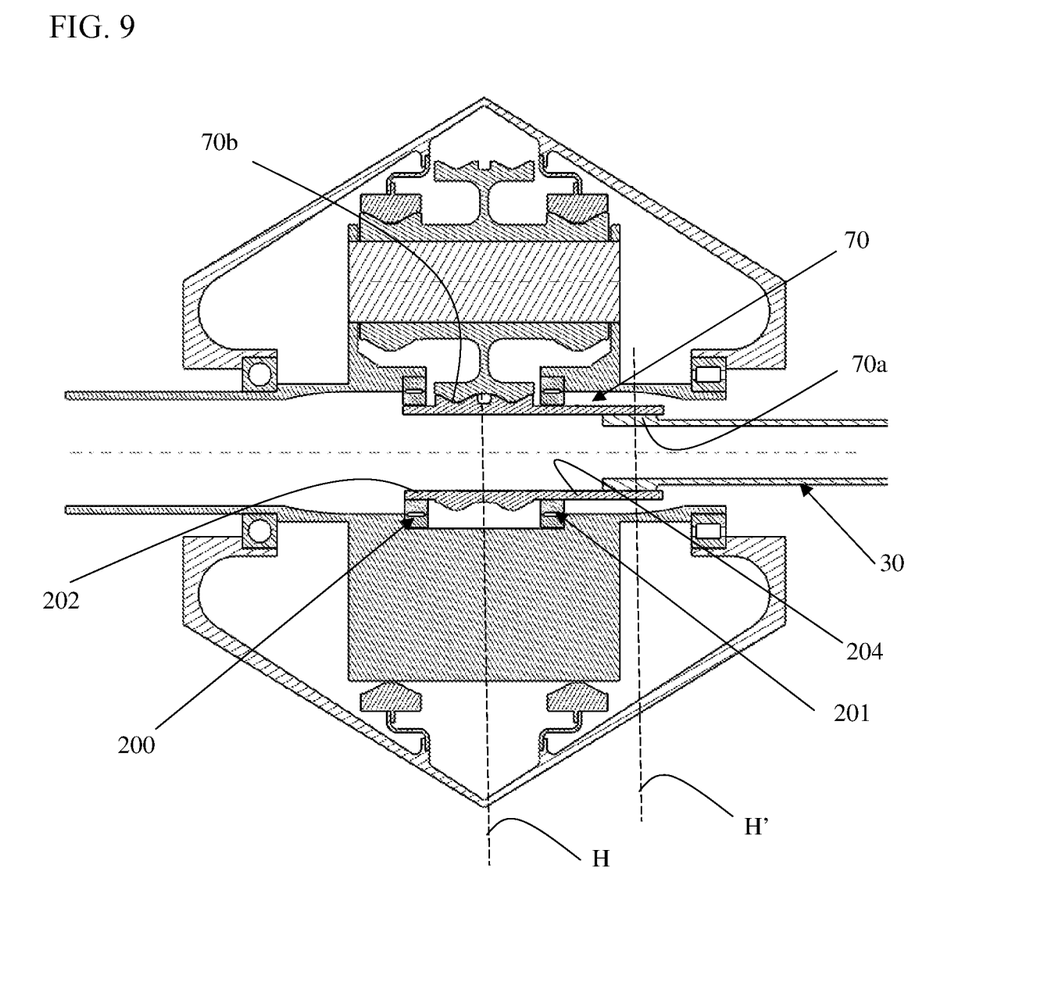
FIG. 9 is a schematic axial sectional view of a mechanical reducer, of the symmetrical double-stage type, and illustrates an alternative embodiment of the disclosure.

The sun gear 70 in FIG. 9 differs from that in FIG. 8 essentially in that the bearings 200, 201 are plain bearings and not rolling bearings.

Figure 10:
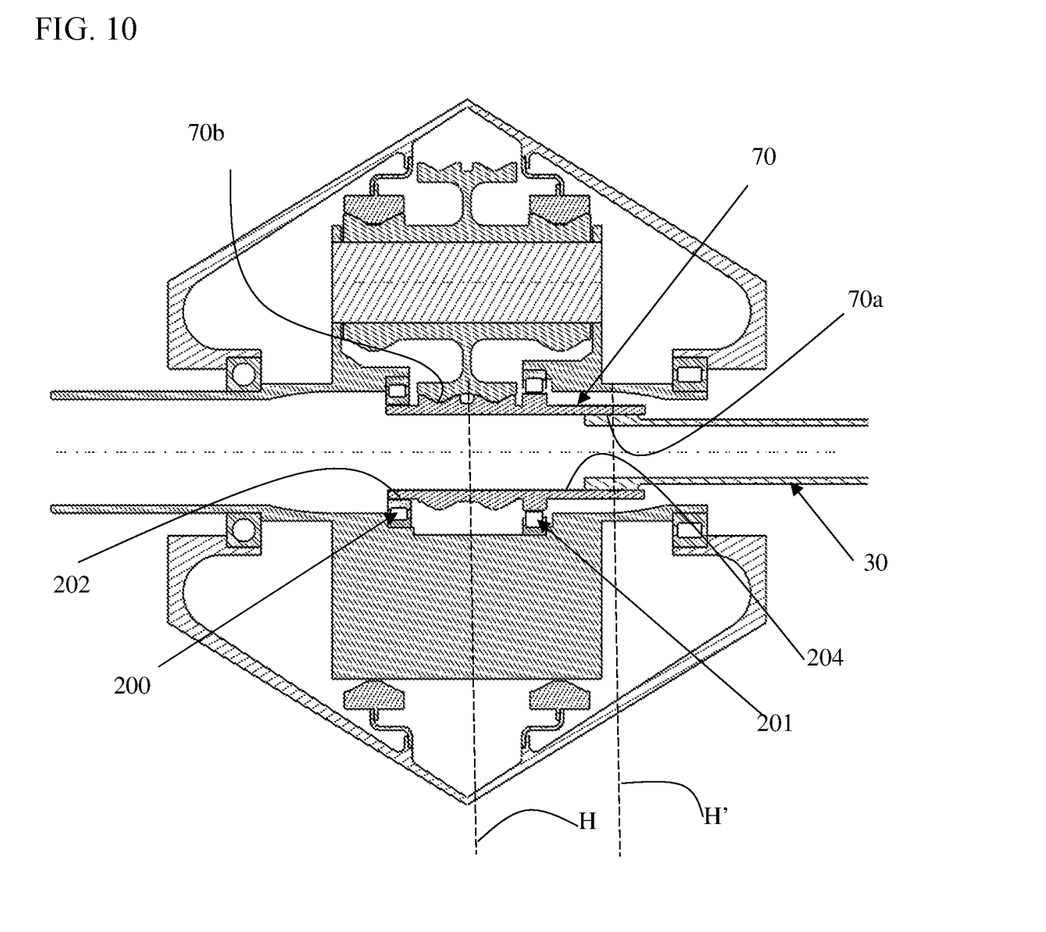
FIG. 10 is a schematic axial sectional view of a mechanical reducer, of the symmetrical double-stage type, and illustrates an alternative embodiment of the disclosure.

The sun gear 70 in FIG. 10 differs from that in FIG. 8 essentially in that the cylindrical surfaces 202a, 204a of the extensions 202, 204 on which the bearings 200, 201 are mounted have different diameters. The larger diameter surface 204a is located downstream and thus the larger diameter bearing 201 is located downstream, namely on the side of the shaft 30.

The internal ring of the bearing 201 is furthermore integrated with the sun gear 70 and in particular with the extension 204.

Figure 11:
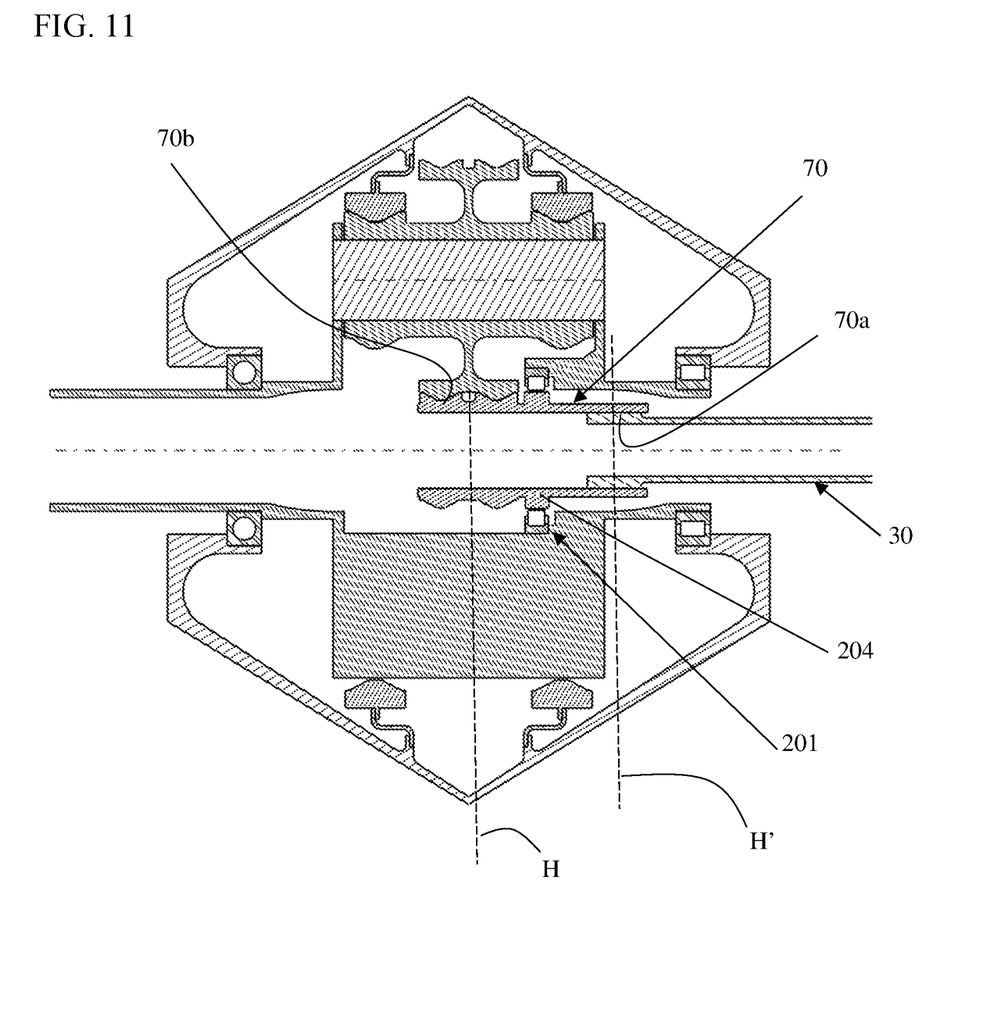
FIG. 11 is a schematic axial sectional view of a mechanical reducer, of the symmetrical double-stage type, and illustrates an alternative embodiment of the disclosure.

The sun gear 70 in FIG. 11 differs from that in FIG. 10 essentially in that the upstream bearing 200 is absent. The sun gear 70 is therefore centered and guided by a single bearing 201, here downstream, and this sun gear 70 comprises a single downstream axial extension 204 of support of this bearing 201.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A mechanical reducer for a turbomachine, the reducer comprising:
   a sun gear having a first axis of rotation, the sun gear having internal splines and an external toothing;
   a ring gear which extends around the sun gear and which has an internal toothing;
   planet gears arranged between the sun gear and the ring gear, each of the planet gears comprising at least one external toothing meshing with the external toothing of the sun gear and the internal toothing of the ring gear, the planet gears being crossed by a plane which is perpendicular to the first axis, the plane passing in the middle of the planet gears and being a plane of symmetry for each of the planet gears, the plane further passing in the middle of the external toothing and in the middle of the internal toothing;
   a planet carrier which carries first bearings for guiding the planet gears in rotation about second axes parallel to the first axis; and
   at least one second bearing for guiding the sun gear in rotation,
   wherein the at least one second bearing is mounted between the sun gear and the planet carrier, and wherein the at least one second bearing is axially remote from the plane,
   wherein the at least one second bearing comprises two second bearings, and wherein the two second bearings are at an axial distance from each other, which is smaller than an axial dimension of the first bearings or of the planet gears,
   wherein the sun gear comprises a first axial tubular extension which extends to one side of the sun gear and on which one of the two second bearings is mounted, and
   wherein the sun gear comprises a second axial tubular extension which extends on an opposite side of the sun gear and on which is mounted the other of the two second bearings.

2. The mechanical reducer of claim 1, wherein the sun gear comprises a first axial tubular extension which extends to one side of the sun gear and on which the at least one second bearing is mounted.

3. The mechanical reducer of claim 1, wherein the first and second extensions comprise external cylindrical surfaces for mounting the two second bearings, wherein the external cylindrical surfaces have a same diameter.

4. The mechanical reducer of claim 1, wherein the first and second extensions comprise external cylindrical surfaces for mounting the two second bearings, wherein the external cylindrical surfaces have different diameters.

5. The mechanical reducer of claim 1, wherein the splines and the toothing of the sun gear are passed through by the plane.

6. The mechanical reducer of claim 1, wherein the splines and the toothing of the sun gear are passed through by first and second distinct planes which are perpendicular to the first axis, the at least one second bearing being located axially between the first and second planes.

7. The mechanical reducer of claim 1, wherein the at least one second bearing is a roller bearing or a plain bearing to provide the sun gear with one degree of freedom in the axial direction relative to the planet carrier.

8. The mechanical reducer of claim 1, wherein the planet gears are arranged around the at least one second bearing.

9. The mechanical reducer of claim 1, further comprising two third bearings for guiding the planet carrier, wherein the at least one second bearing comprises two second bearings which are located on two opposite axial ends of the sun gear and are located between the two third bearings.

10. The mechanical reducer of claim 9, wherein the at least one second bearing has rolling elements which are different from the rolling elements of at least one of the two third bearings.

11. The mechanical reducer of claim 9, wherein the at least one second bearing has a diameter which is different from a diameter of the two third bearings.

12. An aircraft, comprising a mechanical reducer according to claim 1.

13. The mechanical reducer of claim 7, wherein the roller bearing is a cylindrical roller bearing.

14. The mechanical reducer of claim 1, wherein the at least one second bearing is devoid of any ball bearing.

15. A mechanical reducer for a turbomachine, the reducer comprising:
   a sun gear having a first axis of rotation, the sun gear having internal splines and an external toothing;
   a ring gear which extends around the sun gear and which has an internal toothing;

planet gears arranged between the sun gear and the ring gear, each of the planet gears comprising at least one external toothing meshing with the external toothing of the sun gear and the internal toothing of the ring gear, the planet gears being crossed by a plane which is perpendicular to the first axis, the plane passing in the middle of the planet gears and being a plane of symmetry for each of the planet gears, the plane further passing in the middle of the external toothing and in the middle of the internal toothing;

a planet carrier which carries first bearings for guiding the planet gears in rotation about second axes parallel to the first axis; and at least one second bearing for guiding the sun gear in rotation, wherein the at least one second bearing is mounted between the sun gear and the planet carrier, and wherein the at least one second bearing is axially remote from the plane, wherein the at least one second bearing comprises two second bearings, and wherein the two second bearings are at an axial distance from each other, which is smaller than an axial dimension of the first bearings or of the planet gears, and wherein the planet gears are arranged around the at least one second bearing.

16. A mechanical reducer for a turbomachine, the reducer comprising:

a sun gear having a first axis of rotation, the sun gear having internal splines and an external toothing;

a ring gear which extends around the sun gear and which has an internal toothing;

planet gears arranged between the sun gear and the ring gear, each of the planet gears comprising at least one external toothing meshing with the external toothing of the sun gear and the internal toothing of the ring gear, the planet gears being crossed by a plane which is perpendicular to the first axis, the plane passing in the middle of the planet gears and being a plane of symmetry for each of the planet gears, the plane further passing in the middle of the external toothing and in the middle of the internal toothing;

a planet carrier which carries first bearings for guiding the planet gears in rotation about second axes parallel to the first axis; and at least one second bearing for guiding the sun gear in rotation, wherein the at least one second bearing is mounted between the sun gear and the planet carrier, and wherein the at least one second bearing is axially remote from the plane, wherein the at least one second bearing comprises two second bearings, and wherein the two second bearings are at an axial distance from each other, which is smaller than an axial dimension of the first bearings or of the planet gears, and wherein the mechanical reducer further comprises two third bearings for guiding the planet carrier, wherein the at least one second bearing comprises two second bearings which are located on two opposite axial ends of the sun gear and are located between the two third bearings.

* * * * *